United States Patent
Delrieu (10) Patent No.: US 9,067,685 B2
(45) Date of Patent: Jun. 30, 2015

(54) DE-ICING SYSTEMS AND METHODS (71) Applicant: INTERTECHNIQUE, Plaisir, Cedex (FR)

(72) Inventor: Julien Delrieu, Le Chesnay (FR)

(73) Assignee: Zodiac Aerotechnics, Plaisir (FR)

( * ) Notice: Subject to any disclaimer, the term of this patent is extended or adjusted under 35 U.S.C. 154(b) by 188 days.

(21) Appl. No.: 13/834,964

(22) Filed: Mar. 15, 2013

(65) Prior Publication Data

US 2013/0277501 A1 Oct. 24, 2013

Related U.S. Application Data (60) Provisional application No. 61/625,770, filed on Apr. 18, 2012.

(51) Int. Cl.
*B64D 15/16* (2006.01)
(52) U.S. Cl.
CPC ..................... *B64D 15/16* (2013.01)
(58) Field of Classification Search
CPC .................. B64D 15/16; B64C 3/48
USPC ............... 244/134 A, 134 R, 134 E, 134 F
See application file for complete search history.

(56) References Cited

U.S. PATENT DOCUMENTS

| | | | | |
|---|---|---|---|---|
| 4,399,967 A | * | 8/1983 | Sandorff | 244/134 R |
| 4,458,865 A | * | 7/1984 | Sandorff | 244/134 R |
| 5,427,332 A | * | 6/1995 | Rauckhorst et al. | 244/134 A |
| 5,547,150 A | * | 8/1996 | Adams et al. | 244/134 R |
| 5,553,815 A | * | 9/1996 | Adams et al. | 244/134 R |
| 5,887,828 A | | 3/1999 | Appa | |
| 8,517,313 B2 | * | 8/2013 | Gornik | 244/134 R |
| 2012/0074262 A1 | * | 3/2012 | Chuc et al. | 244/134 A |
| 2013/0032671 A1 | * | 2/2013 | Giles et al. | 244/134 R |

FOREIGN PATENT DOCUMENTS

| | | | | |
|---|---|---|---|---|
| EP | 0422746 A2 | * | 4/1991 | B64D 15/16 |
| GB | 523108 A | * | 7/1940 | B64D 15/16 |
| GB | 2472053 A | | 1/2011 | |

OTHER PUBLICATIONS

Venna et al., "Piezoelectric Transducer Actuated Leading Edge De-Icing with Simultaneous Shear and Impulse Forces", Journal of Aircraft, AIAA, Reston, VA, vol. 44, No. 2, Mar. 1, 2007, pp. 509-515.
PCT/IB2013/052362, Search Report and Written Opinion dated May 30, 2014, 13 pages.
PCT/IB2013/052362, International Preliminary Report on Patentability dated Oct. 30, 2014, 9 pages.

* cited by examiner

*Primary Examiner* — Tien Dinh
*Assistant Examiner* — Christopher Hutchens
(74) *Attorney, Agent, or Firm* — Kilpatrick Townsend & Stockton LLP; Dean W. Russell; Renae Bailey Wainwright (57) ABSTRACT

An de-icing system comprising a shield that is configured to deform in a pre-determined way that de-bonds accreted ice. In some embodiments, the shield has a variable (non-uniform) stiffness across its width and/or length such that it undergoes a twist-like or other suitable deformation when subjected to a force. In some embodiments, the system includes a plurality of electro-mechanical actuators configured to generate the force applied to the shield.

21 Claims, 6 Drawing Sheets

DE-ICING SYSTEMS AND METHODS

FIELD OF THE INVENTION

This application claims the benefit of U.S. Provisional Application Ser. No. 61/625,770 filed Apr. 18, 2012 and titled "Smart Erosion Shield Concept," the contents of which are incorporated herein by reference.

FIELD OF THE INVENTION

Embodiments of the invention generally relate to de-icing systems and methods.

BACKGROUND OF THE INVENTION

While on the ground and during flight, aircrafts may be subjected to weather and other conditions that lead to the accumulation/accretion of ice on components of the aircraft. Ice accretion on the aircraft wings, airfoils, rotors, sensors and other components may affect the aircraft's performance and flight safety by reducing lift, increasing draft and weight, and by disturbing sensors and their ability to take proper measurements. As such, regulations require onboard de-icing and anti-icing systems to prevent the accumulation of ice on the aircraft.

SUMMARY OF THE INVENTION

The terms "invention," "the invention," "this invention" and "the present invention" used in this patent are intended to refer broadly to all of the subject matter of this patent and the patent claims below. Statements containing these terms should not be understood to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to the entire specification of this patent, all drawings and each claim.

In certain embodiments there is provided an electro-mechanical de-icing system having a shield configured to deform in a controlled and optimized way to de-bond accreted ice. In some embodiments, the shield has a variable (non-uniform) stiffness across its width such that its deformation may be twist-like (or have another suitable profile) when the shield is subjected to a force.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the following appended figures, in which use of like reference numerals in different features is intended to illustrate like or analogous components.

DETAILED DESCRIPTION OF THE DRAWINGS

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
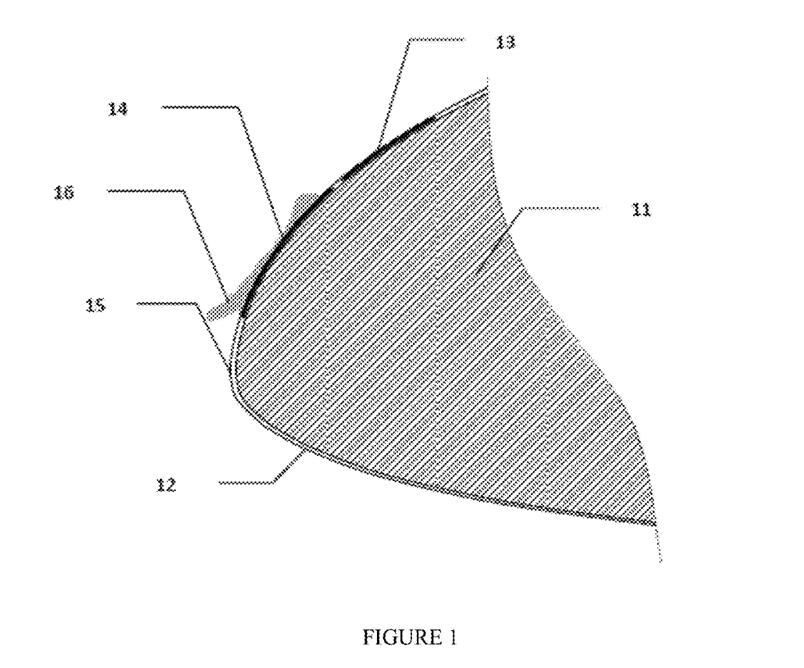
FIG. 1 is a cross-sectional view of a wing profile with a de-icing system according to one embodiment.

Disclosed herein are systems and processes for de-icing aircraft components such as, but not limited to, wings or slats. While the systems disclosed herein are discussed for use in aircrafts, they are by no means so limited and may be used in helicopters, jets, rotorcrafts, or other applications where de-icing is desired. FIG. 1 illustrates a cross-section of an aircraft wing or slat structure 11. As shown in FIG. 1, one or more electro-mechanical de-icing systems, such as de-icing systems 13 and 14, may be positioned generally along a leading edge 15 of the wing 11. In some cases, ice 16 is generally prone to ice accretion or runback ice accretion along the leading edge 15 of the wing. As shown, de-icing systems 13 and 14 may be positioned proximate ice accretion 16, although they need not be.

In some embodiments, the de-icing system includes at least a portion of shield 12, which may be an erosion shield and which substantially covers the leading edge 15 of the wing 11 and helps protect the wing against various environmental elements such as, but not limited to, bird strikes, lightning strikes, corrosion, etc. Due to the placement of shield 12 around the wing 11, ice (such as at areas 16) may accrete directly on an outer surface of the shield 12. In some cases, the shield 12 is formed of a thin metal sheet such as aluminum or stainless steel or other suitable material. Shield 12 may be affixed or adhered to the wing 11 in any suitable way. In some cases, the deicing systems 13, 14 (which may include one or more actuators described below) are integral with the shield 12, although they need not be. In some embodiments, the one or more actuators are positioned between the shield 12 and the wing 11.

Figure 2:
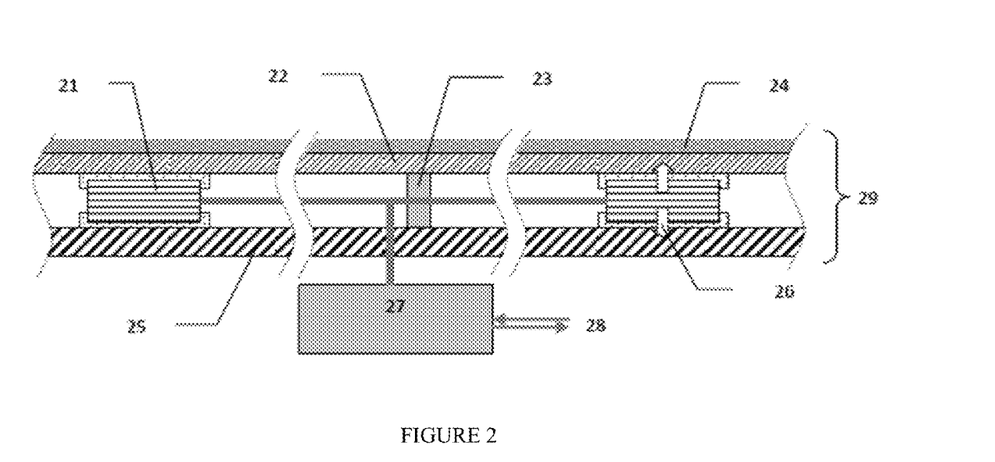
FIG. 2 is a cross-sectional view of a de-icing system according to one embodiment.

FIG. 2 illustrates an embodiment of a de-icing system 29 that includes a shield 22 and one or more actuators 21. Actuators 21 may be electro-magnetic (such as but not limited to coils), piezoelectric or any other suitable electrical actuator and are positioned between an inner surface of the shield 22 and a support structure 25, which in some embodiments is a rigid structure bonded to the wing or slat structure. Actuators 21 are configured to generate forces, such as forces 26, along shield 22. As shown in FIG. 2, de-icing system 29 also includes a discharge unit 27 that supplies the energy required to drive the one or more actuators 21 and a control unit 28 that may be programmed to control the de-icing logic in response to the actual ice conditions. In some embodiments, the system 29 also includes one or more fixation points 23, at which the shield 22 is affixed to the support structure 25. As illustrated in FIG. 2, an ice layer 24 may accrete on the outer surface of the shield 22, as the outer surface of the shield 22 is external to the aircraft wing and exposed to the elements.

Figure 3A:
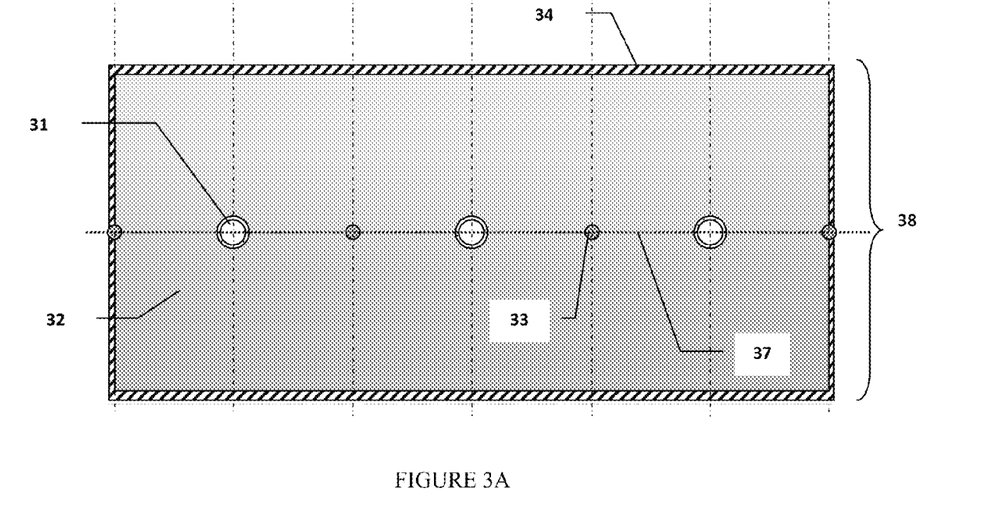
FIG. 3A is a bottom schematic view of a de-icing system according to one embodiment.
Figure 3B:
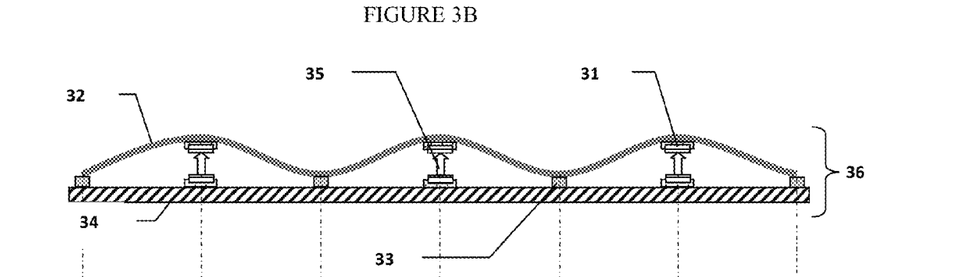
FIG. 3B is a cross-sectional view of the system of FIG. 3A, taken along the line 37.

FIG. 3A illustrates a bottom view of one embodiment of an electro-mechanical de-icing system 38, while FIG. 3B illustrates a cross-sectional view 36 of system 38 taken along line 37. The amount of deformation and displacement of shield 32 in FIG. 3B is over-scaled for illustration purposes. FIGS. 3A-3B illustrate a system 38 having three actuators 31, although any suitable number of actuators may be used. As shown in FIG. 3B, actuators 31 induce forces 35 that cause the shield 32 to deform and help break and/or de-bond the accreted ice layer. The performance of the de-icing system is dependent in part on the amount of displacement and acceleration of the shield 32 as caused by the forces 35 of the actuators 31, as well as the provided energy and the shape and configuration of the shield deformation. In turn, the deformation of the shield 32 depends in part on the location of one or more fixation points 33 (at which the shield is connected to the wing or other structure) and the location of the one or more actuators 31 and the spacing between the one or more actuators 31.

Figure 4:
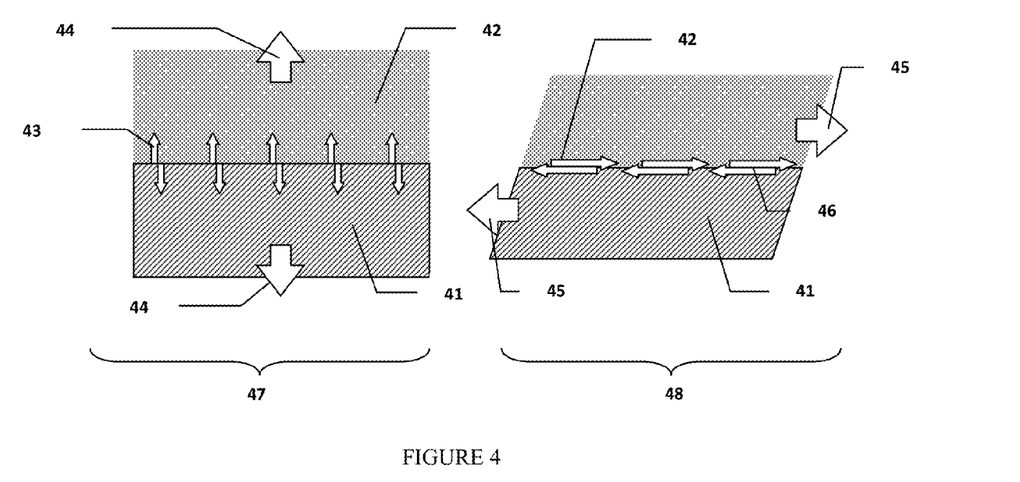
FIG. 4 illustrates normal stresses and shear stresses of a de-icing system according to one embodiment.

As mentioned, the performance of the de-icing system 38 is correlated to the shape and magnitude of the shield deformation, which is caused by the actuators 31. Specifically, the deformation of the shield generates forces that, if strong enough, de-bond the accreted ice. FIG. 4 illustrates two types of ice cohesion forces between the ice and the outer surface of the shield: normal cohesion forces 47 and tangential cohesions forces 48. To counteract the normal cohesion forces 47 of the accreted ice, a normal traction force 44 may be applied between the accreted ice 42 and the shield 41, which generates a normal stress 43 at the shield/ice interface. To counteract the tangential cohesion force 48, a lateral traction force 45 may be applied between the accreted ice 42 and the shield 41, which generates a shear stress 46 at the shield/ice interface. In some cases, as discussed below, the lateral traction force 45 and the normal traction force 44 are generated by the deformation of the shield when it is subjected to the actuator forces.

The shear stresses 45 and 46 and/or the normal stresses 44 and 43 generated by the deformation of the shield 41, along with the resulting flexion, generate break stress inside the ice layer 42. However, a sufficient amount of shear stresses 46 and 45 and normal stresses 44 and 43 must be generated to break the ice cohesion forces and de-bond the accreted ice. To ensure that sufficient stresses are generated, the shield may be configured so that its deformation shape is controllable and optimized as discussed below. Using shear stress generated by the shield deformation to de-bond the ice allows the de-icing process to be more independent of the ice layer thickness. Using shear stress is also advantageous because tangential cohesion forces are generally weaker than normal cohesion forces.

In some embodiments, systems are provided that control and/or optimize the amount of deformation of the shield (and thus the deformation shape of the shield) to control the shear and/or normal stresses along the shield/ice interface and the accreted ice, creating controlled ice breakage zones. To accomplish this, the shield is configured such that it has a variable/non-uniform stiffness across its width W and/or its length L (FIG. 5B). Because it has a variable/non-uniform stiffness across its width and/or length, the shield undergoes a twist-like or other suitable deformation when subjected to a force. A twist-like deformation mode provides for a uniform and distributed shear stress at the shield/ice interface.

Figure 5A:
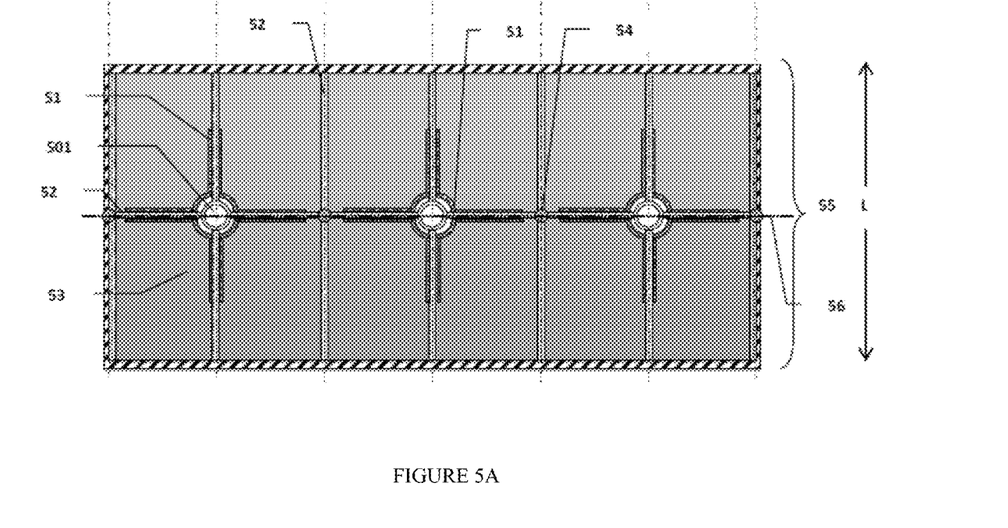
FIG. 5A is a bottom schematic view of a de-icing system according to one embodiment.
Figure 5B:
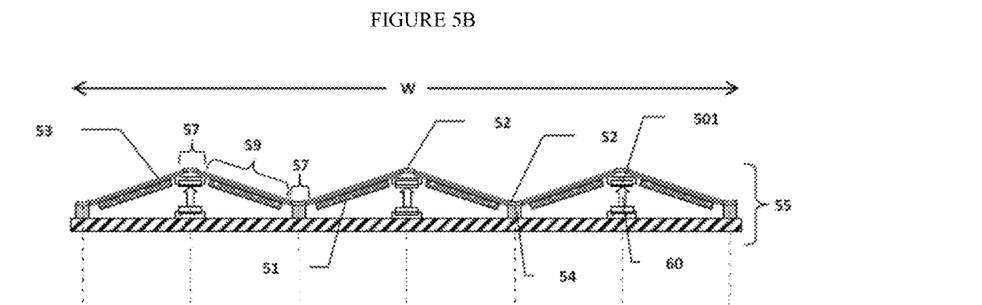
FIG. 5B is a cross-sectional view of the system of FIG. 5A, taken along the line 56.

FIGS. 5A-5B illustrate an example of a de-icing system 55 that is configured to control the shield 53 deformation shape such that the deformation generates sufficient forces to break and/or de-bond the ice layer. Specifically, the shield 53 is configured such that its stiffness varies across its width W and/or length L, as discussed below. FIG. 5A shows a bottom view of de-icing system 55, while FIG. 5B shows a cross-sectional view of the de-icing system taken along line 56. As illustrated in FIGS. 5A-5B, shield 53 may be fixed along one or more fixation points 54 to an aircraft wing or other structure to help restrain the shield under deformation As illustrated, the de-icing system 55 includes one or more stiffeners 51 and one or more areas of reduced thickness 52 between each of the one or more stiffeners 51 along the width W and/or length L of the shield 53. The stiffeners 51 can be any suitable structure that support the shield 53 and provide increased stiffness (high stiffness zones) along portions of the shield. Some non-limiting examples of stiffeners 51 include stringers, composite fibers, wire frames, laminated or layered frames, etc. In some embodiments, the stiffeners 51 are bonded or affixed to the inner surface of the shield 53 in any suitable way. In some embodiments, the stiffeners 51 project generally radially from each of the one or more actuators 501, as shown in FIG. 5A, although they may have other configurations in other embodiments.

Figure 6:
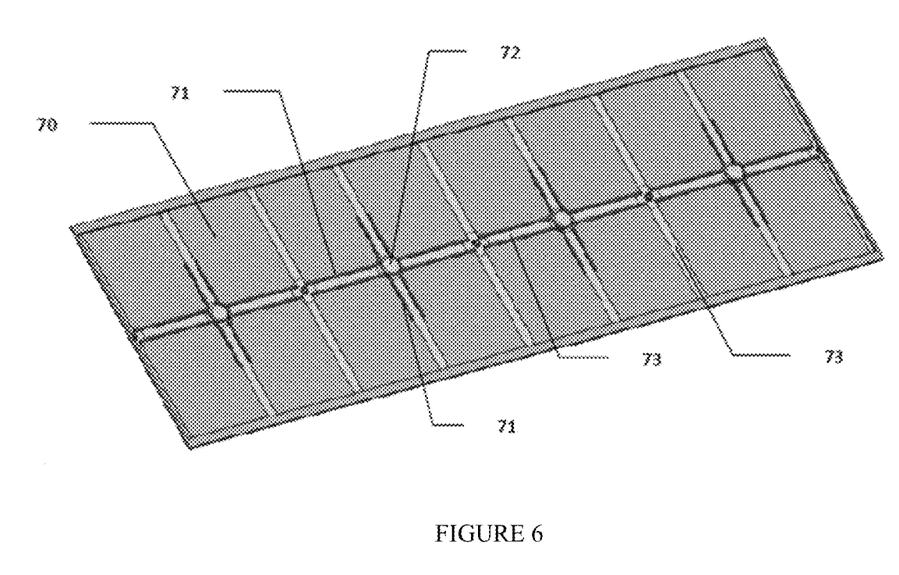
FIG. 6 is a bottom schematic view of a de-icing system according to another embodiment.

One or more thickness reduction areas 52 are present between the stiffeners 51. The one or more thickness reduction areas 52 are lower stiffness areas along the shield 53. In some embodiments, thickness reduction areas 52 are simply areas that do not have stiffeners 51 and in other embodiments may include weakening strips or other structural changes (such as, but not limited to, reductions in the thickness of the shield 53 along these areas 52) that reduce the stiffness of the shield 53 along areas 52. In some embodiments, as illustrated in FIGS. 5A-5B, the thickness reduction areas 52 are relatively thin areas, particularly when compared with the width of stiffeners 51. FIG. 6 illustrates an embodiment of a de-icing system having a shield 70 with a plurality of stringers 71 that extend generally radially from one or more actuators 72 and with a plurality of weakening strips 73 that serve as the thickness reduction areas.

The configuration and placement of the one or more stiffeners 51 and the one or more thickness reduction areas 52 along the shield creates variable stiffness along the width W and/or length L of the shield 53. In particular, as the shield 53 is subjected to the forces 60 generated by the one or more actuators, the bending profile of the shield 53 is reduced along the portions of the shield 53 that include the stiffeners 51. The reduced bending profile increases the curvature radius of the shield along the stiffeners 51 and encourages twist deformation 59 along the portions of the shield 53 that include stiffeners 51. The twisting deformation in turn increases ice de-bonding between the one or more actuators 501 and the one or more rigid fixation points 54.

Along these same lines, the curvature radius along portions 57 of the deformed shield 53 corresponding to thickness reduction areas 52 is reduced because the twist is distributed along the stiffeners 51, which in turn concentrates the flexion along the portions 57 and increases the break stress along these areas, which promotes breakage inside the ice layer. The presence of one or more thickness reductions 52 also helps reduce the amount of energy needed to reach the required level of displacement to de-bond the ice layer.

The configuration of the shield 53, in particular the variable/non-uniform stiffness across the width and/or length of the shield, is such that the forces applied to the shield by the one or more actuators cause a twist-like deformation across the shield, which in turn generates a distributed and uniform shear stress (such as force 46 in FIG. 4) at the shield/ice interface, with such forces being of sufficient magnitude to break the cohesion bonds of the accreted ice and de-ice the outer surface of the wing. In some cases, the generated shear stresses occur along a wider area than if the shield had a uniform stiffness across its width and/or length.

By controlling and/or optimizing shield deformation as described above, the de-icing performance is improved. Moreover, the required forces to deform the shield can be reduced, as well as the size and/or number of the actuators needed to generate the required forces. As such, the space required between actuators can be increased. In turn, the dimensions and weight of the control units can be decreased, while power consumption can also be decreased.

Figure 7A:
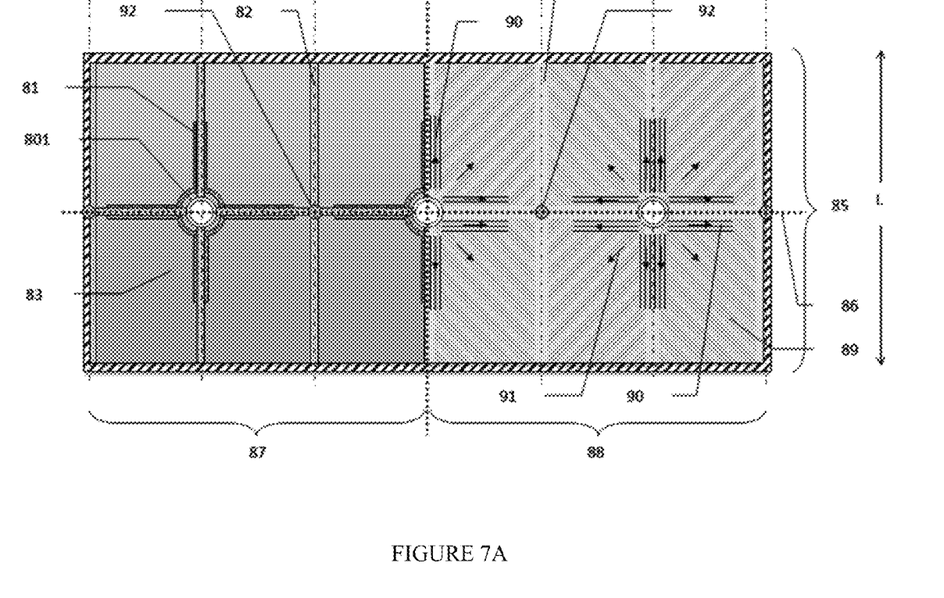
FIG. 7A is a bottom schematic view comparing two de-icing systems according to two embodiments.
Figure 7B:
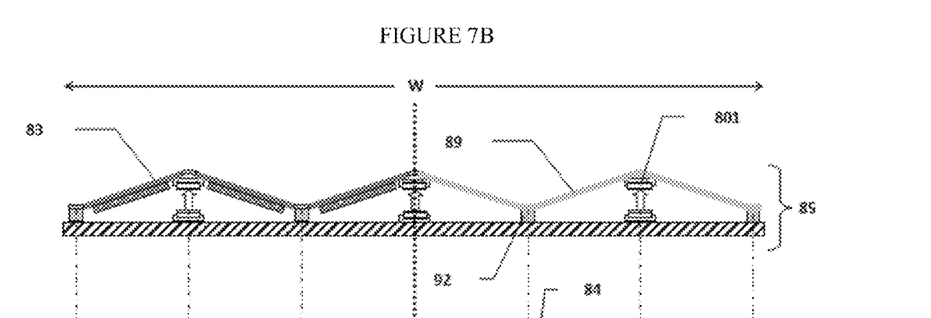
FIG. 7B is a cross-sectional view of the systems of FIG. 7A, taken along the line 86.

Shields having variable stiffness as described herein can be formed of any suitable materials including, but not limited to, composites materials with multiple layers and/or any suitable fiber arrangement (including various fiber types and various orientations of such fibers within one or more layers) to reach the desired deformation mode. One non-limiting example of a fiber composite patchwork system is illustrated in FIGS. 7A-7B. FIG. 7A shows a bottom view of de-icing system 85, the left portion of which represents a thickness variation/stiffener system 87 and the right portion of which represents a fiber composite patchwork system 88. FIG. 7B shows a cross-sectional view of the de-icing system 85 taken along line 86.

Like system 55 in FIGS. 5A-5B, system 87 includes a shield 83 that may be fixed along one or more fixation points 92 to an aircraft wing or other structure to help restrain the shield under deformation. The system 87 also includes a plurality of stiffeners 81 and thickness reduction areas 82, as described above, which may be positioned/oriented and modified in any suitable way.

System 88 includes a fiber composite shield 89 that may be fixed along one or more fixation points 92 to an aircraft wing or other structure to help restrain the shield under deformation. System 88 also includes a plurality of high stiffness areas 90 (which may be composite patches or areas having fibers or other materials configured such that the areas are relatively stiffer) that generally extend along the direction of arrows 91, although stiffness areas 90 may be positioned/oriented in any suitable way. System 88 also includes a plurality of low stiffness areas 84 having fibers or other materials configured such that the areas have a relatively lower stiffness (for example, by using lower density fibers or otherwise). There are many ways of achieving a higher stiffness in the plurality of high stiffness areas 90 and a lower stiffness in the plurality of low stiffness areas 84, such as, but not limited to, by varying the configuration/orientation of the fibers, varying the density or other properties of the fibers used, varying the materials used, varying the layers arrangement of the materials, varying the diameter of the fibers, etc.

As described above, the systems 87 and 88 are configured to encourage the shield to undergo a twist-like or other suitable deformation when subjected to forces from actuators 801 due to the variations in stiffness along the width W and/or length L. The anisotropic behavior and heterogeneous fiber arrangement of system 88 is configured in some embodiments to give substantially the same mechanical deformation shape and/or profile as the system 87, which achieves thickness variation by incorporating stiffeners or the like and areas of reduced thickness or weakening strips or the like. The invention is not limited to the arrangements illustrated and described. Rather, any suitable modification may be made to achieve the desired level of deformation and/or the desired deformation profile.

Other shields having variable stiffness can be formed, for example, by machining a sheet having a plurality of stringers and weakness strips or other suitable structures. In other embodiments, the shield includes a wire frame and/or laminated multi-layer composites and/or a layered frame.

The systems disclosed herein can be used alone or may be used in conjunction with any other suitable de-icing system.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

I claim:

1. An aircraft de-icing system comprising:
a shield having an inner surface and an outer surface,
wherein the shield is fixed to an aircraft wing or slat structure at a plurality of fixation points;
one or more actuators positioned adjacent the inner surface of the shield and spaced apart from each of the plurality of fixation points,
wherein each of the one or more actuators is configured to generate an actuator force against the inner surface of the shield;
and a plurality of stiffeners and a plurality of reduced thickness areas arranged along a width of the shield
so that a thickness between the inner surface and the outer surface of the shield varies across the width of the shield
and causes the shield to undergo a non-uniform flexion when subjected to the actuator forces,
wherein a stiffness of the shield is greater at a portion of the shield having one of the plurality of stiffeners than at one of the plurality of reduced thickness areas,
and wherein a location of each of the plurality of reduced thickness areas along the width of the shield generally aligns with a location of one of the plurality of fixation points.

2. The system of claim 1, wherein the one or more actuators are electro-mechanical actuators.

3. The system of claim 1, wherein, when the shield is subjected to the actuator forces, a first radius of curvature of the shield is greater along the width and a length of the shield having the plurality of stiffeners than a second radius of curvature along the plurality of reduced thickness areas.

4. The system of claim 1, wherein some of the plurality of stiffeners extend generally radially from one of the one or more actuators.

5. The system of claim 1, wherein the non-uniform flexion generates unified shear forces greater than a cohesion force of ice.

6. The system of claim 1, wherein at least some of the plurality of reduced thickness areas comprise one or more weakness strips.

7. The aircraft de-icing system of claim 1, wherein the thickness of the shield varies across a length of the shield.

8. The aircraft de-icing system of claim 1, wherein at least some of the plurality of stiffeners generally extend from one of the one or more actuators.

9. A system for de-icing a wing comprising:
a shield having an inner surface and an outer surface and having a stiffness that varies along a width of the shield due to a plurality of high stiffness areas and a plurality of low stiffness areas;
a plurality of fixation points that fix the inner surface of the shield to the wing or a slat structure;
and a plurality of actuators spaced apart from each of the plurality of fixation points and each configured to apply a force to the shield,
wherein the variable stiffness of the shield causes non-uniform deformation along the shield when the shield is subjected to the forces,
and wherein a location of each of the plurality of low stiffness areas along the width of the shield generally aligns with a location of one of the plurality of fixation points.

10. The system of claim 9, wherein the actuators are electro-mechanical actuators.

11. The system of claim 9, wherein a width of each of the plurality of high stiffness areas is greater than a width of each of the plurality of low stiffness areas.

12. The system of claim 9, wherein some of the plurality of high stiffness areas extend generally radially from at least one of the plurality of actuators.

13. The system of claim 9, wherein the shield is positioned along a leading edge of the wing.

14. The system for de-icing a wing of claim 9, wherein the stiffness of the shield varies along a length of the shield.

15. The system for de-icing a wing of claim 9, wherein each of the plurality of high stiffness areas generally extends from one of the plurality of actuators toward one of the plurality of fixation points.

16. A system for de-icing a wing comprising:
a shield formed of a fiber composite material,
wherein the shield has an outer surface and an inner surface and wherein a stiffness of the shield varies along a width of the shield;
a plurality of fixation points at which an inner surface of the shield is coupled with the wing or a slat structure;
a plurality of actuators spaced apart from each of the plurality of fixation points and each configured to apply a force to the shield;
a plurality of high stiffness areas and a plurality of low stiffness areas;
wherein each of the plurality of low stiffness areas aligns generally along the width of the shield with one of the plurality of fixation points to cause a non-uniform deformation along the width of the shield when the shield is subjected to the forces.

17. The system of claim 16, wherein the plurality of high stiffness areas include fibers that are oriented and are configured such that a stiffness of the high stiffness areas is greater than a stiffness of the plurality of the low stiffness areas.

18. The system for de-icing a wing of claim 16, wherein the stiffness of the shield varies along a length of the shield.

19. The system for de-icing a wing of claim 16, wherein each of the plurality of high stiffness areas generally extends from one of the plurality of actuators toward one of the plurality of fixation points.

20. A system for de-icing a wing comprising:
a laminate shield formed of a composite material comprising layers,
wherein the layers are configured such that the shield includes a plurality of high stiffness areas and a plurality of low stiffness areas to vary a stiffness of the shield along a width and a length of the shield;
a plurality of fixation points at which an inner surface of the laminate shield is coupled with the wing or a slat structure;
and a plurality of actuators separated from each of the plurality of fixation points and each configured to apply a force to the shield,
wherein each of the plurality of low stiffness areas is positioned to align generally with one of the plurality of fixation points,
and wherein the configuration of the layers of the shield causes a non-uniform deformation along the width and the length of the shield when the shield is subjected to the forces.

21. The system for de-icing a wing of claim 20, wherein each of the plurality of high stiffness areas generally extends from one of the plurality of actuators toward one of the plurality of fixation points.

* * * * *